July 13, 1965     R. H. HARTMAN     3,195,078
MICROWAVE DEVICE

Filed Oct. 29, 1962     4 Sheets-Sheet 1

INVENTOR
Robert H. Hartman
BY
*Robert E. Strausser*
ATTORNEY

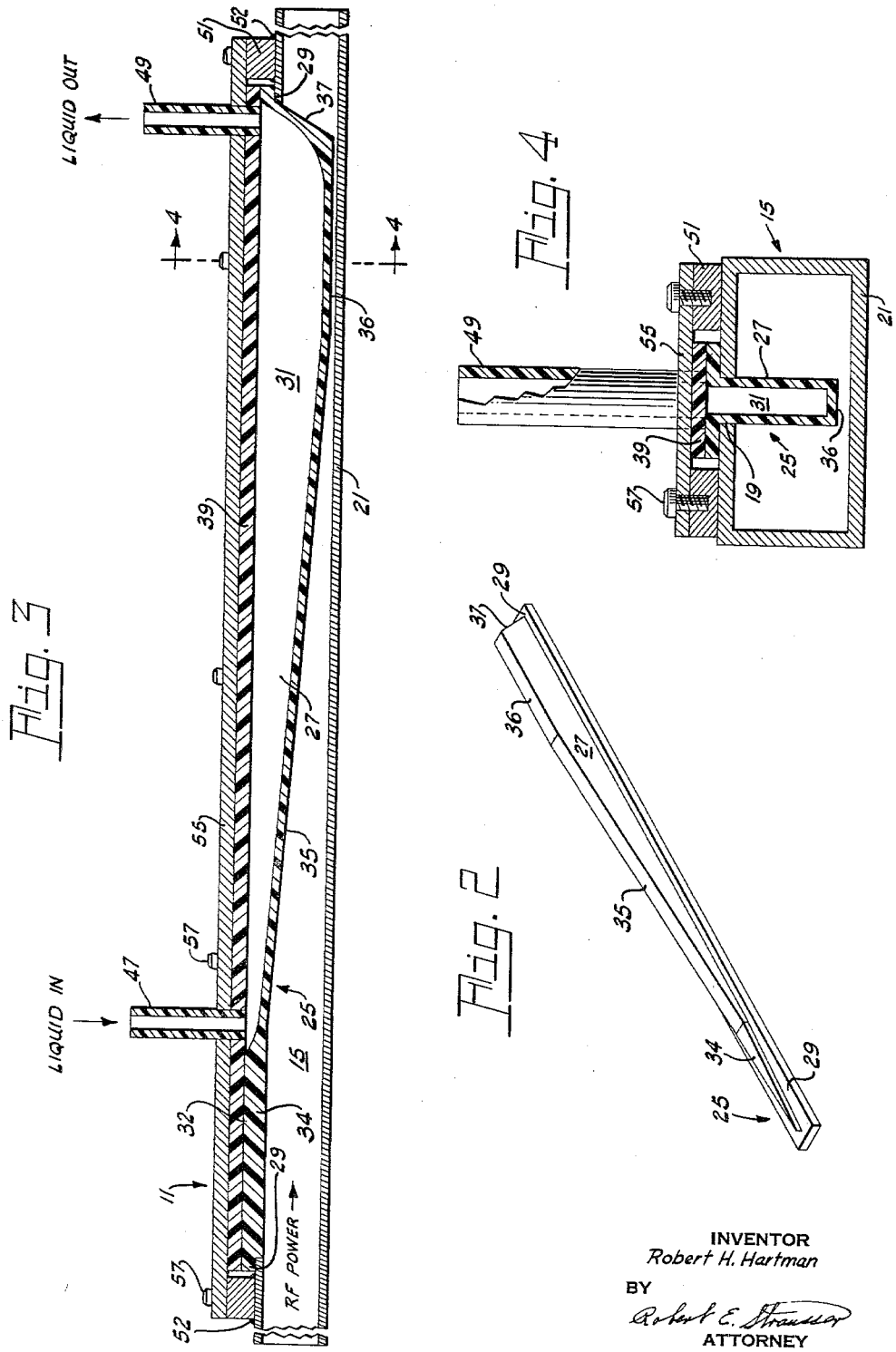

July 13, 1965    R. H. HARTMAN    3,195,078
MICROWAVE DEVICE
Filed Oct. 29, 1962    4 Sheets-Sheet 3

INVENTOR
Robert H. Hartman
BY
ATTORNEY 3,195,078
MICROWAVE DEVICE
Robert H. Hartman, Williamsport, Pa., assignor, by mesne assignments, to Litton Industries, Inc., Beverly Hills, Calif., a corporation of Delaware
Filed Oct. 29, 1962, Ser. No. 233,708
4 Claims. (Cl. 333—81)

This invention relates to a power absorbing device and more particularly to a calorimetric fluid load device for the measurement of microwave power.

In the operation of high frequency microwave apparatus it is often desirous, for measurement of calibration purposes, to determine the RF power generated therein or transmitted thereto. A conventional method utilized for broadband RF power measurement is known as dissipative termination. By this technique a fluid filled loading device, capable of absorbing power and dissipating it in the form of heat, is introduced into the power carrying waveguide or other transmission medium so that the impedance is gradually decreased. The greater the amount of moving fluid absorber in the high E field portion of the waveguide, the greater the RF power absorption. The moving fluid load, wherein the high frequency power is absorbed and converted into heat, undergoes a temperature rise measurable by comparative calorimetric means. Pure water is normally utilized as the fluid component of the load since it is an ideal absorber having high specific heat and high loss tangent at microwave frequencies. The high dielectric constant of water at microwave frequencies, which is approximately 50, makes this fluid affect the guide impedance substantially the same as a piece of metal of the same size as the fluid volume.

Calorimetric fluid loads have been constructed in a variety of hollow designs including tubes, cones, and wedges which were variously positioned within waveguide structures to absorb the power therein. Effectiveness varied according to the disadvantages inherent in the different designs. Undesirable signal reflections were generated in the designs where the absorbing fluid was introduced too abruptly into the waveguide. Troublesome signal reflections were also present when the tips of the reentrant cone and wedge designs were made too large. Upon making the tips of these designs sharper to reduce reflection, stagnant fluid pockets in the pointed portions became excessively hot and caused serious power measurement errors. Reflections from the load tip could be balanced out by other reflections but these were generally very frequency sensitive and required careful adjustment for each load.

The water temperature rise in the fluid load, when using a thermopile temperature sensing element, should be limited to about 20° C. to keep the heat loss errors down.

Voltage standing wave ratio (VSWR) is a measure of the amount of reflected signal present. A VSWR of 1.0 indicates there is no reflected signal present. Therefore, in designing fluid loads it is the object to achieve a VSWR value as close to 1.00 as possible. Calorimetric loads as commonly manufactured have VSWR's in the vicinity of 1.1. The most desirable loads known to be available have VSWR values of approximately 1.05.

Accordingly, it is an object of this invention to reduce the aforementioned difficulties and to provide an improved calorimetric fluid load device for the measurement of microwave power.

Another object is to provide a calorimetric fluid load that has a very low VSWR on the order of 1.02 or less.

A further object is to provide for gradual and efficient fluid loading embodying unrestricted fluid flow with freedom from stagnation whereby there is a minimum of reflection.

Additional objects include the provisions for a calorimetric fluid load which is rugged, easily reproduced, without adjustments, and capable of being adapted to measure average power levels of the bandpass frequencies in a variety of waveguide sizes.

The foregoing objects are achieved in one aspect of the invention by the provision of a calorimetric fluid load device for the measurement of microwave power which employs a tapered hollow blade of dielectric material disposed to gradually penetrate a section of waveguide through a longitudinal slot in the wall thereof. A high loss fluid such as water is circulated through the hollow blade as a sheet of fluid to absorb the microwave power in the waveguide. The power thus dissipated in the load raises the temperature of the circulating fluid which is comparatively measured by calorimetric means for power determination.

For a better understanding of the present invention, together with other and further objects, advantages, and capabilities thereof, reference is made to the following disclosure and appended claims in connection with the accompanying drawings in which:

FIG. 2 is a perspective view illustrating the bottom contour of the hollow blade;

FIG. 3 is a longitudinal sectional view showing the fluid load assembly;

FIG. 4 is a crsos-sectional view illustrating the assembly through section X—X of FIG. 3;

Figure 1:
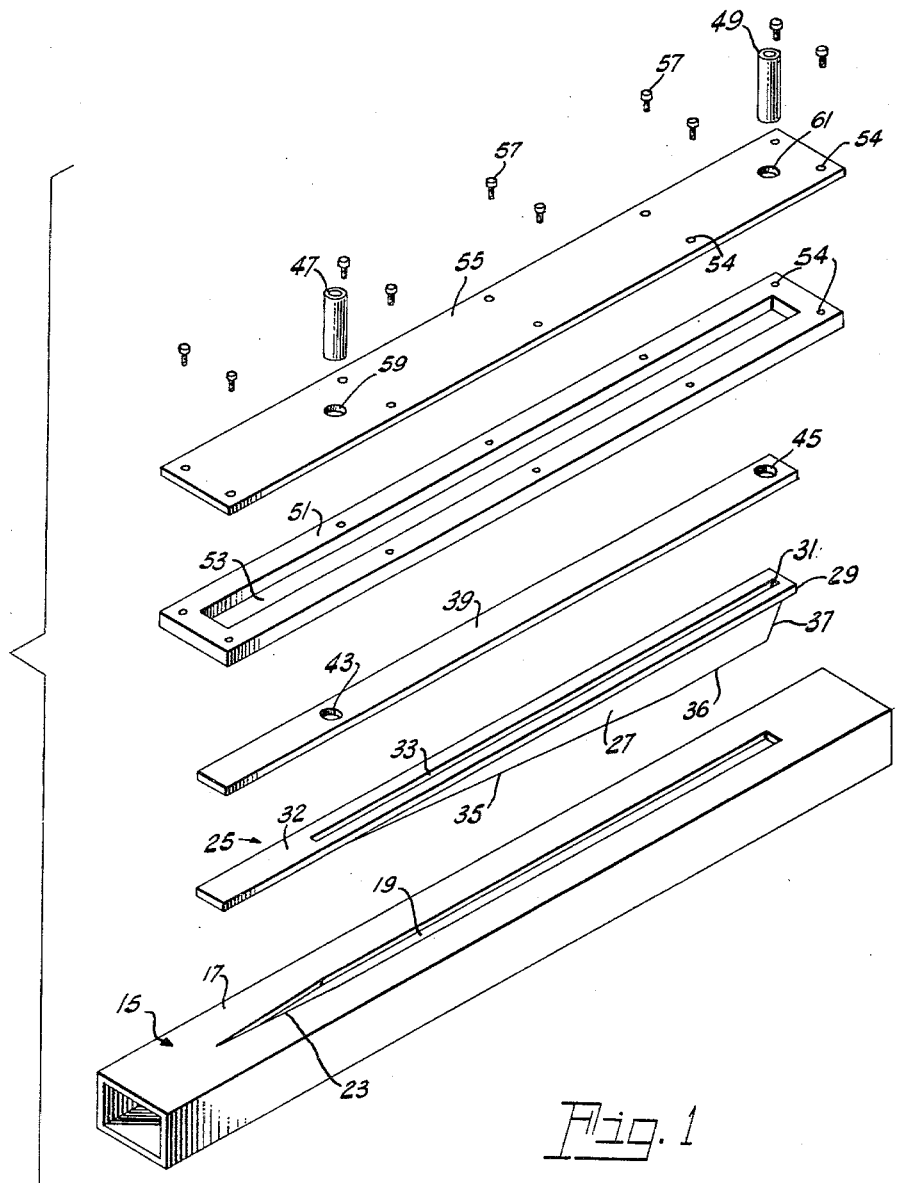
FIG. 1 is an exploded view showing the respective parts of the device.

Referring to FIGS. 1 and 3, the fluid load device 11 includes a section of metallic waveguide 15 which contains a longitudinal slot 19 of substantially uniform width having a convergently formed end portion 23. Into this slot 19 there is seated a fluid load insert 25 of dielectric material having a blade portion 27 with a slit formed hollow interior 31 of consistent width and an external taper 35 formed to gradually penetrate the waveguide 15. A seal plate 39, having a pair of spaced apertures 43 and 45 fitted with tubes 47 and 49, covers the blade hollow 31. A metal closure plate 51 and a metal retaining plate 55 having spaced apertures 59 and 61 cap the assembly thus completing the structure of the fluid load device 11.

In more specific detail, waveguide section 15 as shown in FIGS. 1 and 4 is rectangular in cross section, but the structure of device 11 is equally adaptable for usage in square and circular waveguide shapes for the more prevalent modes conventionally associated therewith.

Fluid load device 11 is efficiently adaptable to a wide range of waveguide sizes having been used with equal success in the smaller sizes down to and including type RG 96/U which has internal dimensions of .280 inch by .140 inch.

The waveguide section 15 is such as to be conveniently fitted onto and removed from a waveguide structure of like size. Materially, section 15 preferably should be of the same composition as the waveguide structure whereon it is attached such as for example brass, aluminum, or silver.

The waveguide section 15 has a longitudinal slot 19 of substantially uniform width centrally positioned in broad side 17 thereof. The end of slot 19 toward the incoming power has a convergently formed end portion 23 to initiate gradual impedance change. The size of the slot is determined by the size of the respective waveguide and the blade portion 27 of fluid load insert 25 which is seated therein. For example, in a RG 51/U waveguide the width of slot 19 is .128 inch with a total length of 10.025 inches of which the end portion convergence 23 is 2.000 inches. In a RG 96/U guide the width of slot 19 is .075 inch with a total length of 3.950 inches of which the end portion convergence 23 is 1.200 inches.

In FIG. 2 there is shown an inverted or bottom view of insert 25 illustrating the seating rim 29 and the blade portion 27. The whole of insert 25 is of a dielectric material such as ceramic or plastic of which specific examples may be polypropylene and tetrafluoroethylene, the latter being known as "Teflon" and commercially available from E. I. du Pont de Nemours and Company, Wilmington, Delaware.

With reference to the construction of dielectric insert 25, the blade portion 27, in addition to seating rim 29, is contoured with a leading pointed portion 34 of solid material formed to mate with the convergently formed end portion 23 of waveguide slot 19, being parallel therewith. From the solid pointed portion 34 the contour of the blade portion 27 continues angularly on an extended external taper 35, then progresses through a similar reverse angle to a longitudinal portion 36 from which it angles obtusely along edge 37 to seating rim 29.

It will be noted in FIG. 3 that the hollow interior 31 of blade portion 27 is interiorly contoured substantially similar to exterior taper 35 and longitudinal portion 36. The hollow interior 31 is in the form of a longitudinal slit of consistent width which affords an unrestricted passageway for a sheet of moving fluid constituting the fluid loading portion of the device 11.

In FIG. 1 the fluid load insert 25 is shown as positioned for the insertion of blade portion 27 into slot 19 of waveguide 15. The slit formed hollow interior 31 of blade portion 27 manifests itself on the planar upper surface 32 as a narrow longitudinal opening 33.

FIG. 1 shows a seal plate 39 having therein a pair of spaced apertures 43 and 45. Seal plate 39 has width and length dimensions substantially equal to like dimensions of insert 25, the two parts being formed of similar materials, as for example, "Teflon" in this instance. The plate is cemented to upper surface 32 of insert 25 effecting a fluid-tight bond therebetween. In order to effect satisfactory bonding, the "Teflon" surfaces must be chemically etched prior to the application of a suitable bonding cement. Tubes 47 and 49, as of "Teflon," are fitted into apertures 43 and 45 and cemented therein to provide inlet and outlet fluid connection means respectively; inlet tube 47 and outlet tube 49 opening into the hollow interior 31 of blade portion 27. The inlet and outlet fluid connections are of sufficient internal dimensions to enable unrestricted fluid flow therethrough, there being no constrictions at either end.

After seating blade 27 of insert 25 into slot 19 in waveguide 15, seating rim 29 and seal plate 39 are in stacked sequence above surface 17 of the waveguide. A metal closure plate 51, as of brass, has a thickness equal to the stacked sequence of seating rim 29 and seal plate 39. In addition, the closure plate has a longitudinal rectangular opening 53 of sufficient dimensions to encompass the seating rim and seal plate. The ends of the metallic closure plate 51 are bonded to the metallic surface 17 of waveguide 15 by suitable solder joints 52. Also, in the closure plate are a plurality of threaded holes 54 perimetrically located in spaced relationship, to match a set of holes 56 in brass retaining plate 55. Through these holes 56 are inserted threaded studs 57 to suitably fasten retaining plate 55 to closure plate 51. Apertures 59 and 61 in the retaining plate 55 are sufficiently oversize and properly spaced to accommodate the insertion therethrough of fluid tubes 47 and 49.

The circulating fluid dielectric, while not shown, may be pure water as previously mentioned, but other suitable fluids may also be utilized. Water, in addition to being inexpensive and readily available, has high RF power attenuation properties and high specific heat which make it an efficient power absorber when properly oriented.

In fluid load device 11, water is circulated through the hollow slit-like interior 31 of blade 27, entering through inlet 47 and leaving through outlet 49, there being no intervening restrictions to fluid flow.

The superior operational features of device 11 are illustrated in FIG. 3. Hollow interior 31 is devoid of angular pockets which produce localized heating and consequent power measurement errors. This feature and the gradual taper 35 of blade 27 contribute to the desirably low VSWR of the device. The taper 35 of blade 27 gradually introduces the absorber into the waveguide 15 so that the guide attenuation and impedance is slowly increased over several wavelengths of the RF power carried therein. The power absorption increases as blade 27 gradually penetrates the waveguide.

To achieve minimum reflection certain conditions must be adequately fulfilled. Variation in the parameters of a transmission line, such as waveguide, will produce little reflection if the variation is small per wave length in the transmission line. In a lossless transmission line, a given length of line with a given impedance variation from end to end will have a minimum reflection if the impedance varies exponentially. The lossy line or load can have its impedance vary more rapidly than the above for the same impedance change in a shorter length of line with no increase in reflection. This situation is brought about in a lossy line by the attenuation between the input and a point of reflection and the further attenuation between the point of reflection and the input. The two-way attenuation greatly reduces the effect of any faulty area in a highly lossy section of transmission line. The initial rate of change in impedance must be just as slow in the lossy case as in the nonlossy case, since the loss in the first wavelength of line is small.

Reflection formulation may be closely calculated by the formula $$r = \frac{\lambda g_0}{8\pi} \times \frac{\left(\frac{Z_e}{Z_0} - 1\right)}{D}$$

When the blade taper is linear, $\lambda g_0$ is guide wavelength ahead of the insert, D is length of the taper, $$\frac{Z_0}{Z_0}$$

is relative guide impedance at the end of the taper. This formula applies when most of the incident energy is absorbed in the linear tapered section of the blade 27.

For tapers other than linear, which are gradual and approximately linear, in the first wavelengths replace $$\frac{\left(\frac{Z_e}{Z_0} - 1\right)}{D}$$

in the above formula by $$\frac{d\left(\frac{Z}{Z_0}\right)}{d_x}$$

which represents the slope of the impedance in the early portion of the taper; then $$r = \frac{\lambda g_0}{8\pi} \times \frac{d\left(\frac{Z}{Z_0}\right)}{d_x}$$

The VSWR previously mentioned is equal to $$\frac{1+r}{1-r}$$

in which $r$ is the coefficient of reflection. This reduces to the following approximate formula for $r < .1$ $$VSWR \cong 1 + 2r$$

Figure 5:
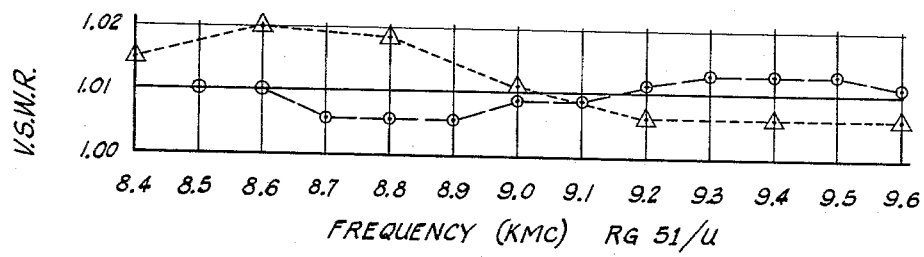
FIG. 5 is a plotting of data comparing typical VSWR values of two X-band loads.

FIG. 5 shows typical VSWR values obtained with two similar X-Band sample fluid load devices in which the VSWR value is 1.02 or less over the full guide bandwidth of 7.05 kmc. to 10.0 kmc. The solid horizontal line indicates the calculated VSWR from the measured impedance variation along the load.

Figure 6:
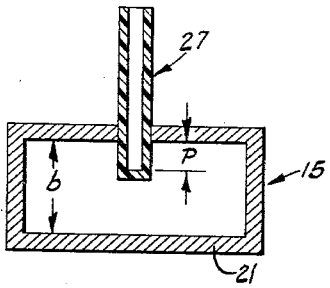
FIG. 6 is a cross-sectional view showing the relationship of penetration of fluid load insert into a waveguide.
Figure 7:
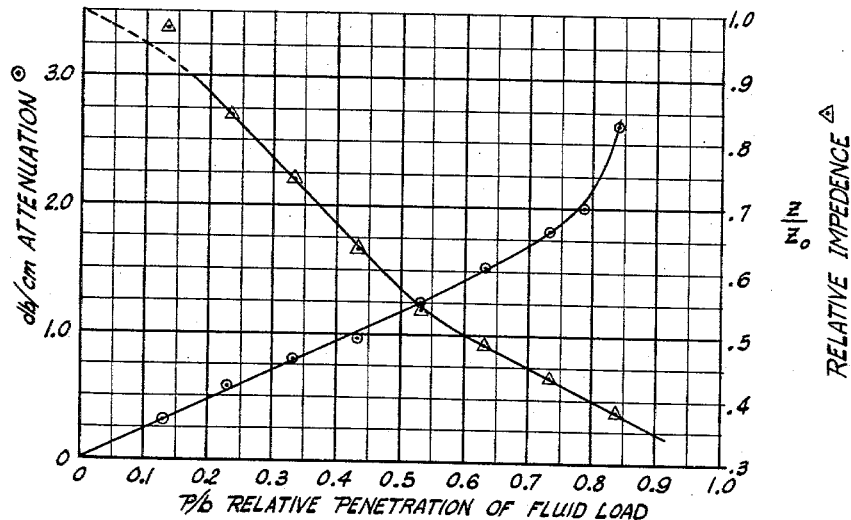
FIG. 7 is a data plotting with reference to FIG. 6 illustrating attenuation and impedance relative to fluid load penetration.

The penetration effects of the fluid containing blade 27 into waveguide 15 are shown in FIGS. 6 and 7. In FIG. 6, P indicates the amount of blade penetration and $b$ signifies the interior depth of the waveguide. The data is with reference to an RG 15/U waveguide at an operating frequency of 9.0 kmc. As the fluid containing blade 27 approaches the opposite broad side 21 of the waveguide 15, the $P/b$ relationship changes whereby the decreases db/cm. attenuation increases and the relative impedance $$\frac{Z}{Z_0}$$

penetration is approximately 85 percent of the waveguide depth. Through the proper design of blade taper, length of load and depth of penetration, the desired power attenuation can be achieved.

When measuring power, a small residual signal is often desired for other uses such as frequency, spectrum, or pulse shape measurements. Should the one-way attenuation be set, for example, at 26 db, 99.75 percent of the incident power is absorbed and a low level residual signal is passed for the aforementioned uses. A short placed at the end of the load will cause it to absorb power with a two-way attenuation, in this case for example 52 db, which is effectively all of the incoming RF power.

The fluid dielectric, in this case water, enters one end of the hollow 31 in blade 27 at a constant rate, travels as an unrestricted sheet of moving fluid through the hollow, absorbs the microwave power in the waveguide, and leaves the other end of the blade at an elevated temperature which is a measure of the energy absorbed. When water is the absorber, the following formula applies:

$$T = 14.34 \frac{P}{Q}$$

in which T is the temperature rise in degrees centigrade, P is the power absorbed in watts, and Q is the flow rate in cc. per minute.

Figure 8:
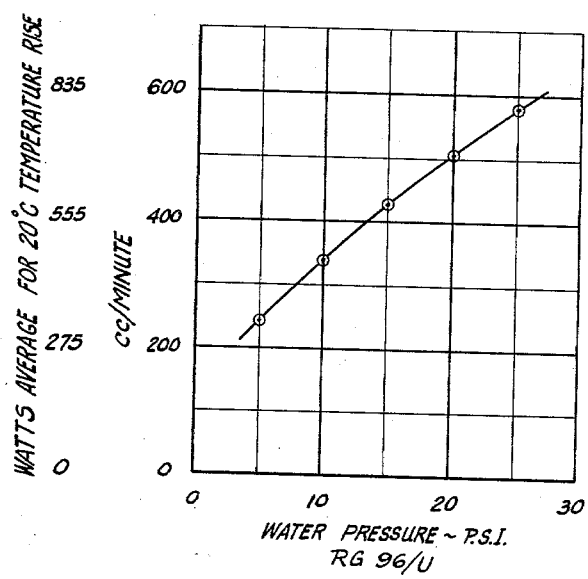
FIG. 8 is a graphic illustration showing the relationship between fluid pressure and power absorption in a type RG 96/U waveguide.
Figure 9:
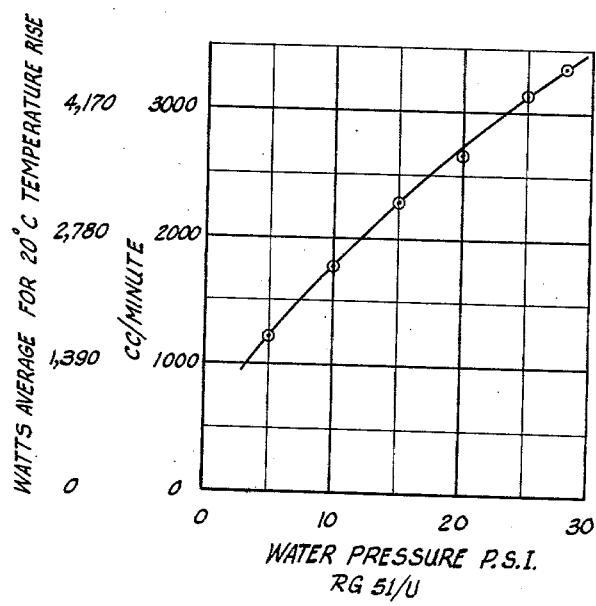
FIG. 9 is a graphic illustration showing the relationship between fluid pressure and power absorption in a type RG 31/U waveguide.

FIGS. 8 and 9 show the average watts of power absorbed for a 20° C. temperature rise at various water pressures for a KA Band Waveguide (RG 96/U) and an X-Band Waveguide (RG 51/U), respectively. As previously mentioned, it is advantageous when utilizing calorimetric measuring means, to limit the fluid temperature rise to approximately 20° C. to keep the heat loss errors to a minimum.

Modifications of the invention may be made if desired. For instance, the width of the fluid sheet may be varied along the load, i.e., the insert hollow having a narrow width at the incoming power end gradually increases in width as the hollow progresses along the load. The impedance variation must be kept within limits dictated by the previously described formula. The impedance will be approximately inversely proportional to the volume of the high loss dielectric fluid midway between the narrow walls of the waveguide section. The rate of penetration of the fluid sheet into the waveguide can also be accomplished in a series of $$\frac{\lambda}{4}$$

longitudinal steps. Care should be taken that the steps are small enough so that the stagnant pockets formed would not be bothersome.

Thus there is provided an improved fluid load device for the measurement of microwave power which exhibits a number of advantages. This device utilizes a unique way of introducing the fluid absorber into the waveguide. A slot, which is tapered at the leading end, is one of the most efficient ways of making an opening into a rectangular waveguide. In the case of this load, the slot is filled with dielectric which makes it appear electrically narrower than it is, thereby physically causing less perturbation of the guide. The rate of fluid penetration vs. distance along the guide can be made as gradual as desired for any maximum reflection level selected without constricting the water flow and limiting the power level which can be measured. The reflection as previously described is directly proportional to the derivative of guide impedance with respect to distance along the guide at the beginning of the load which in turn is directly proportional to the rate of fluid sheet penetration into the guide.

The device is rugged, easily reproduced, without adjustments, and capable of being adapted to measure power levels in a variety of waveguide sizes.

While there have been shown and described what are at present considered the preferred embodiments of the invention, it will be obvious to those skilled in the art that various changes and modifications may be made therein without departing from the invention as defined by the appended claims.

What is claimed is:

1. A calorimetric fluid load device for the measurement of microwave power comprising in combination:
   a section of rectangular waveguide having a centrally defined longitudinal slot in a broad wall thereof, said slot having a convergently formed end portion facing the incoming power,
   an externally tapered hollow blade of low loss dielectric material formed to seat in said slot and gradually perpendicularly penetrate said waveguide wall to extend substantially toward the opposite wall, said hollow being substantially in the form of a fluid-containing slit of consistent width having a gradual internal taper conforming substantially with said externally taper to effect a hollow of increasing volume,
   inlet and outlet fluid connection means provided for the hollow of said blade, said inlet being located at the incoming power end of said blade, said outlet being longitudinally located at the opposite end of said hollow, and
   a defined high loss fluid dielectric disposed for circulation through said hollow blade as a sheet of moving fluid to absorb the microwave power carried by said waveguide.

2. A calorimetic fluid load device for the measurement of microwave power comprising in combination:
   a section of circular waveguide having a centrally defined longitudinal slot in the wall thereof,
   an externally tapered hollow blade of low loss dielectric material formed to seat in said slot and gradually radially penetrate said waveguide wall to extend substantially toward the opposite wall portion, said hollow being substantially in the form of a fluid-containing slit of consistent width having a gradual internal taper conforming substantially with said external taper to effect a hollow of increasing volume,
   inlet and outlet fluid connection means provided for the hollow of said blade, said inlet being located at the incoming power end of said blade, said outlet being longitudinally located at the opposite end of said hollow, and a high loss fluid dielectric disposed for circulation through said hollow blade as a defined sheet of moving fluid to absorb the microwave power carried by said wave guide.

3. A calorimetric fluid load device for the measurement of microwave power comprising in combination:

a section of rectangular waveguide having a centrally defined longitudinal slot in a broad wall thereof, said slot having a convergently formed end portion facing the incoming power, an externally tapered hollow blade of low loss plastic dielectric material formed to seat in said slot and gradually perpendicularly penetrate said waveguide wall to extend substantially toward the opposite wall, said convergently formed slot portion being filled with dielectric material, said hollow being substantially in the form of a fluid-containing slit of consistent width having a gradual internal taper conforming substantially with said external taper, inlet and outlet fluid connection means provided for the hollow of said blade, said inlet being located at the incoming power end of said blade, said outlet being longitudinally located at the opposite end of said hollow, and a water dielectric disposed for circulation through said hollow blade as a sheet of moving fluid to absorb the microwave power carried by said waveguide.

4. A calorimetric fluid load device for the measurement of microwave power comprising in combination:

a section of rectangular waveguide having a centrally defined longitudinal slot in a broad wall thereof, said slot having a convergently formed end portion facing the incoming power, an externally tapered hollow blade of low loss ceramic dielectric material formed to seat in said slot and gradually perpendicularly penetrate said waveguide wall to extend substantially toward the opposite wall, said hollow being substantially in the form of a fluid-containing slit of consistent width having a gradual internal taper conforming substantially with said external taper, inlet and outlet fluid connection means provided for the hollow of said blade, said inlet being located at the incoming power end of said blade, said outlet being longitudinally located at the opposite end of said hollow, and a high loss fluid dielectric disposed for circulation through said hollow blade as a sheet for moving fluid to absorb the microwave power carried by said waveguide.

References Cited by the Examiner

UNITED STATES PATENTS

| | | | |
|---|---|---|---|
| 2,485,030 | 10/49 | Bradley | 333—22 |
| 2,877,428 | 3/59 | Krstansky et al. | 333—22 |
| 3,040,252 | 6/62 | Novak | 333—22 |
| 3,044,027 | 7/62 | Chin et al. | 333—22 |

FOREIGN PATENTS 1,138,865  2/57  France.

HERMAN KARL SAALBACH, *Primary Examiner.*

UNITED STATES PATENT OFFICE
CERTIFICATE OF CORRECTION

Patent No. 3,195,078                  July 13, 1965

Robert H. Hartman

It is hereby certified that error appears in the above numbered patent requiring correction and that the said Letters Patent should read as corrected below.

Column 2, line 28, for "crsos-sectional" read -- cross-sectional --; column 5, lines 25 to 29, for "decreases db/cm. attenuation increases and the relative impedance $\overline{Z}$" read $Z_0$ -- db/cm. attenuation increases and the relative impedance $\dfrac{Z}{Z_0}$ decreases. The maximum --; column 6, line 51, for "externally" read -- external --.

Signed and sealed this 3rd day of January 1967.

SEAL)

ttest:

RNEST W. SWIDER                                EDWARD J. BRENNER ttesting Officer                                          Commissioner of Patents